(No Model.)
J. H. CHAMBERS.
METHOD OF TREATING CORPSES.
No. 431,687. Patented July 8, 1890.
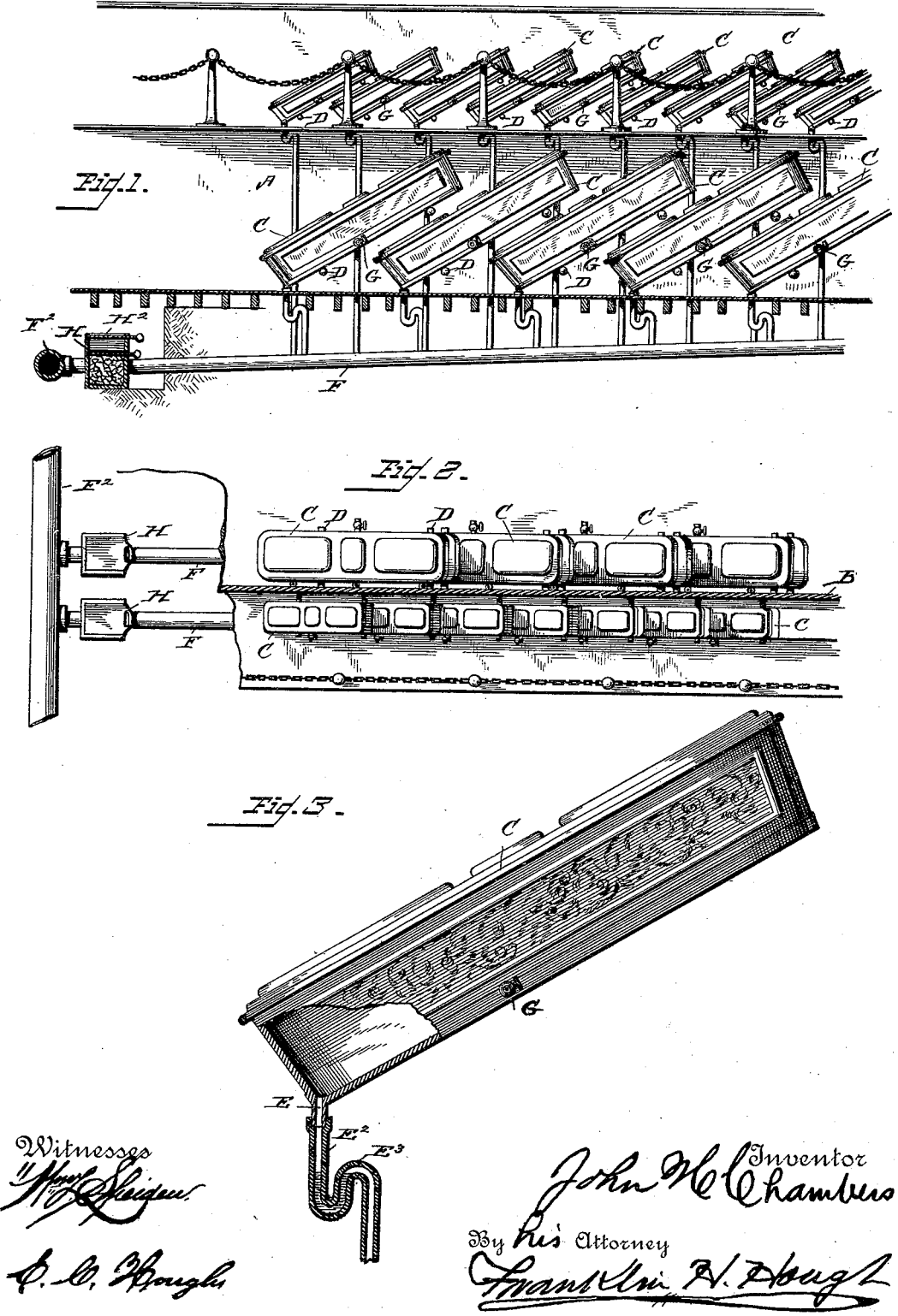

UNITED STATES PATENT OFFICE.

JOHN H. CHAMBERS, OF SCHENECTADY, NEW YORK.

METHOD OF TREATING CORPSES.

SPECIFICATION forming part of Letters Patent No. 431,687, dated July 8, 1890.

Application filed October 21, 1887. Serial No. 253,018. (No model.)

*To all whom it may concern:*

Be it known that I, JOHN H. CHAMBERS, a citizen of the United States, residing at Schenectady, in the county of Schenectady and State of New York, have invented certain new and useful Improvements in the Method or System of Disposing of the Dead; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the preservation of the dead; and it has for its object to provide a system of treating the bodies of human beings after death in such a manner as to effectually preserve a life-like appearance for an indefinite period of time.

A further object of the invention is to provide a means for disposing of the bodies of the dead without in any manner injuriously affecting the sanitary conditions of the vicinity.

To these ends and to such others as the invention may relate the same consists in the peculiar system or method of accomplishing these results.

It is well known that the human body is composed largely of water, and that during the earlier stages of decomposition this liquid is separated from the more solid portions. A serious objection to the various methods of burying or otherwise disposing of the dead as heretofore practiced has been due to the fact that no means have been provided for disposing of the liquid substance which accumulates within the casket or other chamber containing the body, serving to at once both discolor and hasten the decomposition and to endanger the health of persons living in the vicinity.

In the accompanying drawings, Figure 1 represents a longitudinal section through a building fitted with appliances for treating the bodies of the dead in accordance with my invention. Fig. 2 is a top plan of one of the partitions of the building with the caskets in position, the gallery being removed upon one side of the partition so as to show the lower tier of caskets. Fig. 3 is an enlarged view of one of the caskets with its attachments.

Referring now to the details of the drawings, A represents a suitable building provided at intervals with partitions B.

C C are caskets or coffins resting upon pins or other suitable supports D and inclined at an angle, as shown.

E is an outlet or pipe connection with the interior of the casket at the lower end of the same.

$E^2$ is a pipe connected at its upper end by means of any suitable form of joint with the outlet-pipe E. This pipe $E^2$ is bent at a point near its upper end so as to form a double curve or "goose-neck" $E^3$, and at its lower end it connects with the pipe F, for a purpose which will hereinafter appear. The curved portion $E^3$ of the pipe is filled with any suitable disinfectant, which may be renewed at any time either by severing the connection of the pipes at the outlet or by means of a valve at the side of the casket, as is shown at G. It will be at once evident that a series of caskets may be arranged in close proximity to each other, and each may be provided with outlets communicating with the pipe F, as shown and described. The pipe F should be placed at a sufficient angle to permit any liquid substance which it may contain to flow freely through it, and it should be provided at its lower end with a suitable chamber H for the reception of a quantity of alum or other disinfecting substance in a solid form. Access to the chamber may be had by means of a suitable trap or cover $H^2$, and a pipe-connection is established between the chamber and a larger pipe $F^2$, which may be extended to a point below what is commonly termed the "water-line" of the earth.

In carrying my system into operation the body is first embalmed by any of the well-known systems of embalming now in use, and it is then placed within a casket or other inclosing-chamber, arranged as described. As the process of decomposition advances, the liquids find a ready outlet through the outlet-pipes, and after having passed through the chambers containing the disinfectants they are conveyed by means of the sewer-pipe to a point far below the surface of the earth, after having been thoroughly disinfected.

The solid portions of the body being thus relieved of the liquid mass of corruption with which it would otherwise have been surrounded will retain a life-like appearance for an indefinite length of time.

It will be seen that my system of disposing of the dead possesses many advantages, prominent among which may be mentioned the fact that a very large number of bodies may be deposited within a small compass. Instead of using a building, a single story in height, the building may be two or more stories high, and by means of partitions placed at such intervals as to allow a sufficient space only as to permit of a passage-way between the rows of caskets, and by providing each partition with a gallery suitable for the reception of smaller caskets containing the remains of children. The bodies may be inspected at any time or removed when desired, and the expense as compared with the cost of maintaining a burial lot in a cemetery would be but trifling.

While I have described a building constructed with special reference to the carrying out of my system, I do not wish to be confined to the use of such a building, as it is evident that the system is equally well adapted to use in connection with any of the various forms of vaults or graves, and, if desired, the casket may be placed in a horizontal position and pipe-connection established with the bottom instead of the end of the same.

I am aware that it is not new to provide for the removal from the coffin of the fluid matter created by the decomposition of the body, and I do not seek to cover such, broadly. Neither do I claim, broadly, the process of embalming, as I am aware that it has long been the practice to embalm bodies after death; but so far as I aware it never has been proposed to embalm the body and then provide for the exclusion of the air and the removal of the fluid matter from the coffin. This is important. I also attach importance to the employment of the disinfecting-trap in the outlet-pipe to the coffin.

The process herein described and claimed is described but not claimed in my patent, No. 382,136, which is a division of this application.

What I claim to be new is—

As an improved method of treating the dead, the process herein described, which consists in first embalming the body and placing the same in a suitable receptacle, inclined, as shown, causing the fluid matter formed by the decomposition of the body to pass from said receptacle, thence through a disinfecting-trap in the outlet-pipe of the receptacle, and then deodorizing said fluid matter, substantially as and for the purpose specified.

In testimony whereof I affix my signature in presence of two witnesses.

JOHN H. CHAMBERS.

Witnesses:
E. NOTT SCHERMERHORN,
RICHARD FULLER.